United States Patent [19]
Eager

[11] 3,747,143
[45] July 24, 1973

[54] SCREW FORMATION
[75] Inventor: William A. Eager, Cornwall, N.Y.
[73] Assignee: Star Expansion Industries Corporation, Mountainville, N.Y.
[22] Filed: Nov. 22, 1971
[21] Appl. No.: 201,223

Related U.S. Application Data
[62] Division of Ser. No. 132,119, April 7, 1971.

[52] U.S. Cl............................. 10/10 R, 10/4, 10/9, 10/21, 85/47
[51] Int. Cl......... B21h 3/02, B23g 9/00, B21k 1/56
[58] Field of Search..................... 10/4, 9, 10 R, 21, 10/27 R, 152 R, 152 T; 85/41, 47, 48; 408/226, 227, 228, 229, 230

[56] References Cited
UNITED STATES PATENTS

| | | | |
|---|---|---|---|
| 2,263,832 | 11/1941 | Wilcox............................... | 10/10 R |
| 3,241,426 | 3/1966 | Gutshall.............................. | 85/47 |
| 3,358,548 | 12/1967 | Dyslin................................ | 85/47 |
| 3,463,045 | 8/1969 | Prescott.............................. | 85/41 |
| 3,500,713 | 3/1970 | Bell................................... | 85/41 |
| 3,517,542 | 6/1970 | Skierski.............................. | 10/4 |
| 3,550,255 | 12/1970 | Skierski.............................. | 10/10 R |

Primary Examiner—Charles W. Lanham
Assistant Examiner—E. M. Combs
Attorney—Friedman & Goodman

[57] ABSTRACT

An elongate article comprising a shank which includes opposite end portions. One of the end portions constitutes a trailing end portion and the other a drilling or pilot end portion. The pilot end portion has a pair of laterally opposite grooves or flutes each gradually increasing in depth in a direction away from the trailing end portion. Each groove is defined by a pair of adjoining surfaces inclined relative to one another, one of which surfaces constitutes a cutting surface and the other a relief surface. Each cutting surface includes an endmost leading cutting edge portion of generally lateral extent longitudinally inclined relative thereto and extending continuously into the respective flutes. Each endmost leading cutting edge portion is generally symmetrically associated with the other and is inclined continuously into its respective flute to provide a cutting edge of minimum cross-section which directly contacts the material to be drilled.

5 Claims, 14 Drawing Figures

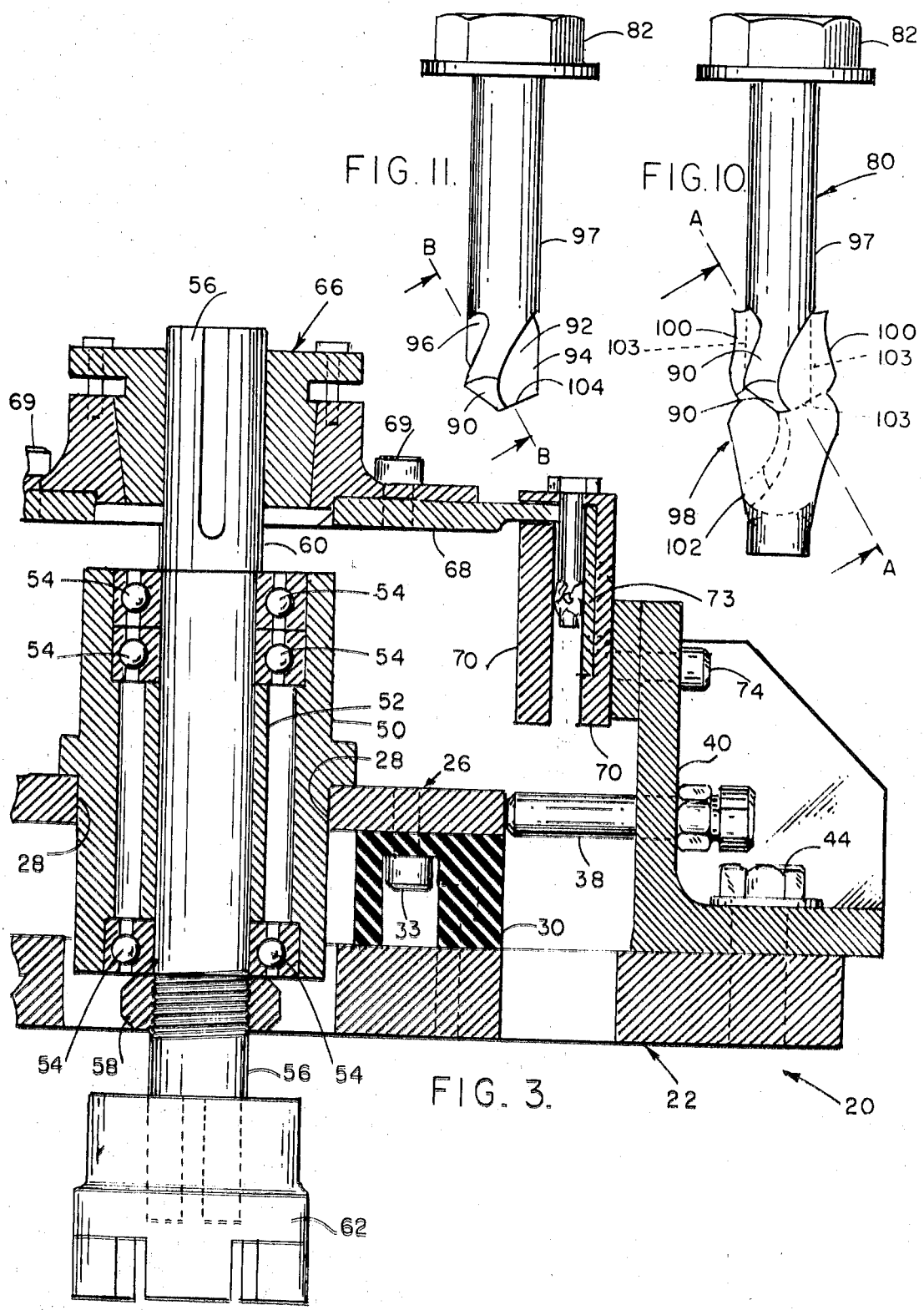

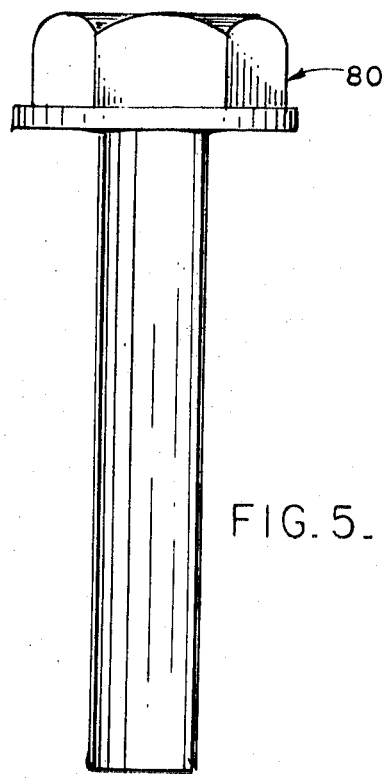
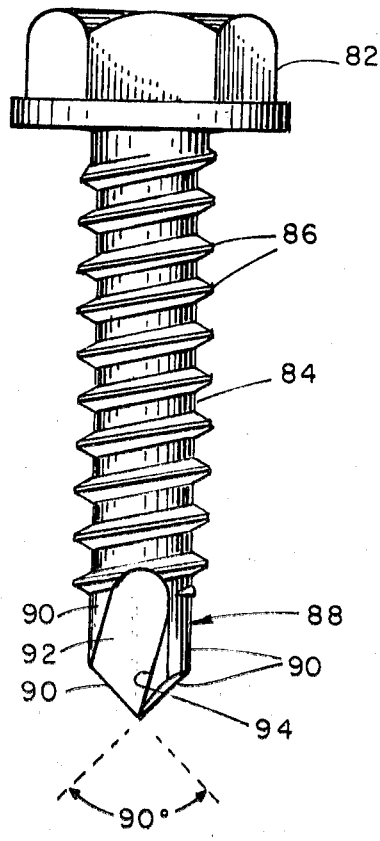
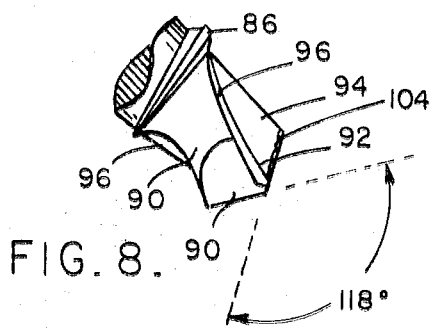
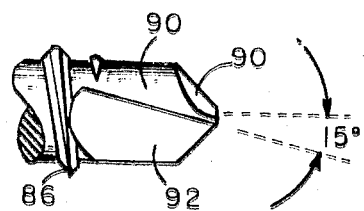
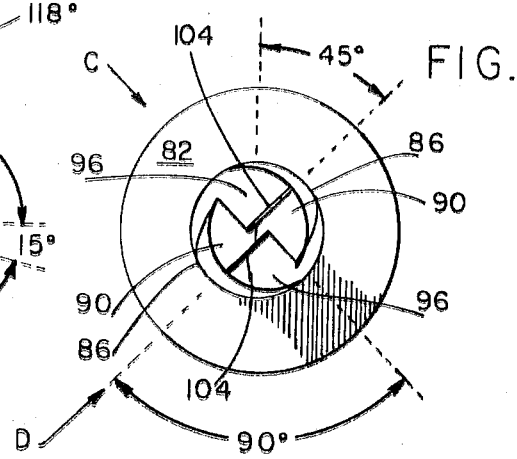

SCREW FORMATION

This is a division of application Ser. No. 132,119 filed Apr. 7, 1971.

BACKGROUND OF THE INVENTION

The present invention relates generally to fasteners, and more particularly to a fastener and a method for making the fastener, which fastener is provided in combination with a drilling-pilot extremity and a shank having threaded convolutions thereon.

Articles having combined screwing and drilling extents are conventional as are methods for forming these combined articles. Generally, the purpose of the drilling extremity is to permit a recess or opening to be formed in material so that the threaded extent may be readily engaged therein with minimal difficulty and rapidly. The drilling extremity is generally constituted of flutes each defined by a cutting surface and a relief surface. The cutting surface is provided with cutting edges for contacting the material to be drilled and in which the threaded extent is to be engaged. It is, therefore, clear that the cutting edges must be sharp to most effectively form a recess or opening to reduce the drilling time and obviate the necessity for excessive force in the drilling stage, which excessive force may deform either the drilling article itself or the material against which the drilling article is urged. Since in fact, these so-called screw-drill fasteners are generally mass produced in great quantity, it is clearly unfeasible, uneconomical and most inefficient to sharpen each cutting edge of the drilling extremity after it has been formed by cold forming, forging or the like. Thus, unless the manufacturing procedure is such that during the various stages of forming the drilling extremity the cutting edges of the latter are also formed so as to directly contact the material in which the recess or opening is to be formed at the terminal-most edge of the cutting edge portion, the resultant screw-drill fastener will be less than most effective.

It is conventionally well known when forming the article to provide the latter with its drilling extremity that immediately after the forming operation the drilling extremity is left with burrs or flash elements that must be removed. It has been determined that if the flash or burrs are removed by twisting the burrs and shank portion relative to one another in the manner as is conventionally done, i.e., in a direction common to that direction for feeding or drilling the finished screw-drill into material to form an opening therein, the resultant cutting edges of the drilling extremity which directly act upon the material will be inclined away from the direction of drill rotation and, thus, the cutting edges have a greater cross-section and are less than most effective had same been formed in accordance with the principles of the present invention as will be discussed below.

SUMMARY OF THE INVENTION

Accordingly, it is an object of the present invention to provide an article constituted of both a threaded extent and a drilling extremity.

It is another object of the present invention to provide a combined screwing and drilling article having cutting edges at the drilling extremity which are inclined in generally the same direction as that direction in which the drilling extremity is to be rotated into material to be drilled.

It is still another object of the present invention to provide a method for manufacturing screw-drill fasteners in mass production such that during the stage of flash or burr removal from the drilling extremity, the cutting edges of the drilling extremity are bent or inclined in generally the same direction as that direction in which the drilling extremity is to be rotated for drilling an opening in material to be drilled.

To this end, and in accordance with the above objects and other objects as will become apparent below, the present invention comprises a shank which includes opposite end portions. One of the end portions constitutes a trailing end portion and the other a pilot end portion. The pilot end portion has a pair of laterally opposite grooves or flutes each gradually increasing in depth in a direction away from the trailing end portion. Each groove is defined by a pair of adjoining surfaces inclined relative to one another, one of which surfaces constitutes a cutting surface and the other a relief surface. Each cutting surface includes an endmost leading cutting edge portion inclined relative thereto and extending continuously into the respective flutes. Each endmost leading cutting edge portion is generally symmetrically associated with the other and is inclined continuously into its respective flute to provide a cutting edge of minimum cross-section which directly contacts the material to be drilled.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 3 is an enlarged cross-sectional view of a fragment of the apparatus illustrated in FIG. 2 as operatively associated with an article pursuant to the present invention;

FIG. 5 illustrates a front elevational view of a blank to be operated upon to provide an article in accordance with the present invention;

FIG. 6 illustrates a front elevational view of the finished article in accordance with the present invention;

FIG. 7 is a generally enlarged plan view illustrating the drilling extremity of the finished article in accordance with the present invnetion;

FIGS. 8 and 9 illustrate respectively fragmentary views of the drilling extremity of the finished article as viewed from the different transverse vantage points corresponding to the arrows C and D in FIG. 7;

FIG. 10 illustrates an article in accordance with the present invention prior to the removal of the flash or burrs thereof in accordance with the principles of the present invention;

FIG. 11 illustrates a front elevational view of the article of FIG. 10 after the removal of the burrs or flash thereof in accordance with the principles of the present invention;

DETAILED DESCRIPTION OF THE INVENTION

Figures 1, 2:
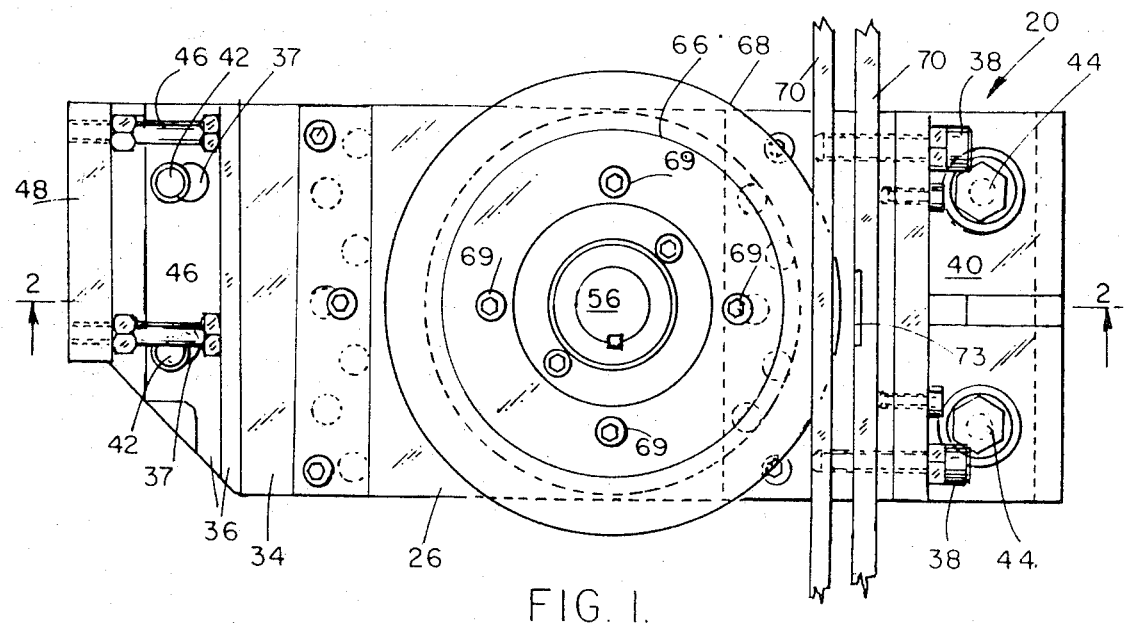
FIG. 1 illustrates generally a plan view of the apparatus for at least partially manufacturing articles in accordance with the present invention.
FIG. 2 is a cross-sectional elevational view of the apparatus as taken along the line 2—2 of FIG. 1.

Referring now to the drawings, and more particularly to FIGS. 1-4, there is illustrated a preferred embodiment for manufacturing retaining articles of the screw-drill variety in accordance with the principles of the present invention. The apparatus is generally characterized as a deburring or flash removal assembly 20. The assembly 20 includes a mounting plate 22, the latter having a transverse opening 24 therethrough and an auxiliary mounting plate 26 also having a transverse opening 28 therein coaxially arranged opposite the transverse opening 24 in the mounting plate 22. The plates 22 and 26 are interconnected by means of elastomeric support blocks 30 and 32 each block having retaining screws 31 and 33 associated therewith and the plates 26 and 22 respectively. As viewed in FIG. 2, there is also provided an elastomeric abutment 34 which is interposed between the plate 26 and the leftmost bracket 36, the latter having slotted openings 37 for its adjustment.

At the righr of the assembly, as viewed in FIG. 1, there are provided a plurality of positioning studs 38 which act to longitudinally bear against the plate 26 for adjusting the position of the latter opposite the plate 22. The positioning studs 38 are adjustably mounted in a bracket 40. The left-most bracket 36 is adjustable relative to the plate 22 and secured to the latter by means of retaining screws 42 which extend through the slotted openings 37 respectively in the bracket 36 so that the position of the bracket 36 can be selectively adjusted relative to the mounting plate 22. The bracket 40 is generally adjustably connected to the mounting plate 22 as by means of the retaining screws 44.

As illustrated in FIGS. 1 and 2, there is provided a bracing stud 46 having opposite threaded extremities for accommodating a pair of nuts 47 respectively, one of which is adapted to contact a shoulder 48 projecting transversely of the mounting plate 22 and the other of which is adapted to engage the bracket 36. In this manner, the pressure of the mounting plate 26 against the positioning studs 38 may be readily adjusted in operative association with the mounting plate 22.

As illustrated in FIGS. 2 and 3, a sleeve or shaft-housing 50 is coaxially arranged within the openings 24 and 28 of the mounting plates 22 and 26 respectively, and is tightly connected to mounting plate 26. Mounted internally of the sleeve 50 is a bushing or spacer 52 and a ball bearing assembly 54 annularly interposed between the bushing 52 and the sleeve 50. Mounted internally of the bushing 52 and bearing assembly 54 is a shaft 56 carrying thereon at one portion extending below and externally of the sleeve 50, a threaded retaining collar 58 for retaining the ball bearing assembly 54 in operative association with the shaft 56 and sleeve 50. The shaft 56 has an upper portion 60 of larger diameter than that of the diameter separating the ball bearings 54 so that the shaft 56 may axially rest on the ball bearing assembly 54 in operative association with the sleeve 50. The other or lower end of the shaft 56 is provided with a coupling 62 for operative association with a rotary drive or the like for rotating the shaft 56 relative to the fixed sleeve 50.

The end portion 60 of the shaft 56 is provided with one or a plurality of key-ways or splines 64 for carrying a rotary annular disk assembly 66. The disk assembly 66 includes a wheel 68 having a serrated periphery (not shown in the drawings), which wheel 68 is fixedly connected to the annular disk assembly 66 by means of retaining screws 69. In this manner, as the shaft 56 is rotatably driven, the annular disk assembly 66 and thereby the wheel 68, are similarly driven without slipping relative to the shaft 56 because of the provision of the splines 64.

Figure 4:
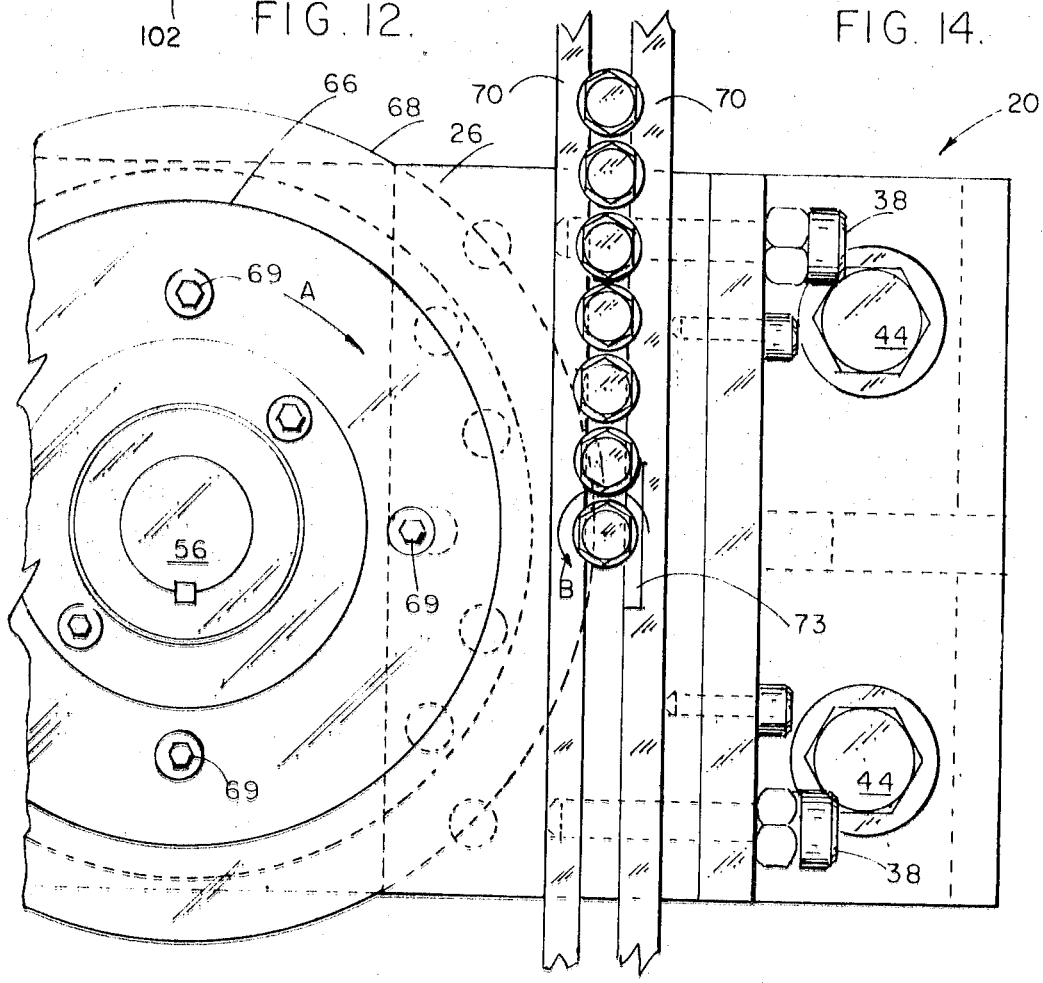
FIG. 4 is an enlarged plan view of a fragment of the apparatus as illustrated in FIG. 1 illustrating the mass production of articles pursuant to the present invention.

As illustrated most clearly in FIGS. 3 and 4, the assembly 20 is provided with a pair of tracks 70 extending parallel to one another in spaced relation transversely of the mounting plate 22. The left-most track 70 is provided with a slot for freely receiving the peripheral edge of the serrated wheel 68 so that the periphery of the latter may project into the space defined by the spaced tracks 70. The right track 70 includes a stationary serrated plate 73 spaced from the bracket 40 through the intermediary of a spacer plate 75. The tracks 70 are mounted on the assembly 20 by conventional means not shown in the drawings, and the spacing therebetween may be adjusted by adjusting the position of the bracket 40 and thereby the pressure urged by the spacer plate 40 against the right-most track 70.

Referring now to FIGS. 5-14, the retaining or screw-drill article is first formed into a blank 80 illustrated in FIG. 5. The blank 80 is formed by conventional means and when operated upon in accordance with the principles of the present invention, results in a finished article as illustrated in FIG. 6. The finished article is constituted of a trailing end portion or manipulating head 82, a shank 84 having threaded convolutions 86 thereon and a pilot or drilling end portion 88. The pilot end portion 88 includes land surfaces 90, relief surfaces 92 and cutting surfaces 94 which are of generally identical configuration respectively and extend in lateral opposition respectively. Each relief surface 92 operatively defines together with its adjoining cutting surface 94 a groove or flute 96. The adjoining relief and cutting surfaces 92 and 94 respectively are generally inclined relative to one another in generally V-shaped cross-section and have an operative configuration such that each of the flutes 96 is symmetrically associated with the other of the flutes 96 in lateral opposition with one another.

Referring now to FIGS. 10-14, and specifically to FIG. 10, the blank 80 is first forged or cold formed by conventional means at the pilot end portion 88 thereof so that the blank 80 is left with a manipulating head 82, an unthreaded shank portion 97 and a pilot portion 88 having flash or burrs 98 formed thereon. The flash or burrs 98 are constituted of removable ears 100 and a common removable nose 102. The removable ears 100 and removable nose 102, as those skilled in the art readily understand, are very thin in cross-section and are integrally connected to the pilot end portion 88 through the intermediary of a plurality of intersecting fracture or pinched folding lines 103 of generally longitudinal and lateral extent respectively.

It has been determined that if the burrs 98 constituted of the removable ears 100 and the removable nose 102 are secured against rotation, and if the shank 97 is rotated relative to the burrs 98, that the burrs 98 will snap off the pilot end portion 88 along the fracture or pinched folding lines 103 aforementioned. In this manner, there results an unthreaded article having a drilling or pilot extremity 88, as illustrated in FIG. 11, with one exception in the absence of rotating the shank 97 relative to the burrs 98 in a manner as will be discussed below.

Before discussing the underlying principles of the present invention, it is significant to point out that the cutting surfaces 94 should be as sharp as possible so that when the drilling pilot end portion 88 is urged against the solid material to be drilled to form a recess opening therein, the force necessary for drilling the opening will be a minimum. Thus, the cutting surfaces 94 are provided with endmost leading cutting edge portions 104 respectively of generally lateral extent to initiate formation of the opening in ghe material to be drilled. In order to enhance the cutting capability of the cutting surfaces 94, the cutting edge portions 104 thereof respectively should continuously extend into their respective flutes 96 so that as the pilot end portion 88 is rotated, the cutting edge portions 104 will directly contact the material to be drilled at their point of minimal cross-section and therefore with a maximum degree of sharpness.

Thus, it has been determined that when operating upon a drilling or pilot extremity 88 which is adapted to be rotated clockwise for drilling an opening in material (the flutes 96 being helically associated with one another in clockwise fashion), the burrs 98 should be fixed against rotation during the deburring operation and the shank 97 must of necessity be rotated counter-clockwise, i.e., in a direction opposite to the normal direction of drilling an opening, so that the edge portion 104 of each of the cutting surfaces 94 is forced to be bent or inclined longitudinally relative its respective cutting surface 94 continuously into its respective flute. In the absence of rotating the shank 97 and burrs 98 relative to one another as discussed above, the edge portion 104 of each cutting surface 94 will be inclined away from its respective flute thus presenting a rounded or blunted cross-section for drilling purposes. In this respect, the drilling extremity will of necessity require slower speed and greater pressure when utilized for drilling purposes and thus, it is possible to deform the drilling article itself because of its rather small cross-section, or the material against which the drilling article is urged, situations which are clearly most undesireable under any circumstance.

Figure 12:
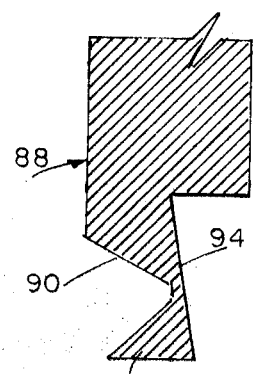
FIG. 12 illustrates an enlarged cross-sectional view taken along the line A—A in FIG. 10.
Figure 13:
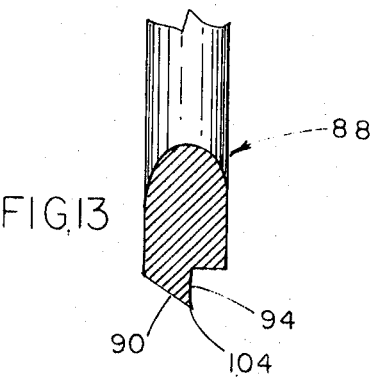
FIG. 13 illustrates a cross-sectional view of the drilling extremity taken along the line B—B in FIG. 11.
Figure 14:
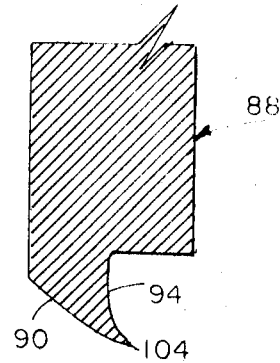
FIG. 14 illustrates an enlarged cross-sectional view taken along the line B—B in FIG. 11 and shows more clearly the incline of the cutting edge of the drillin extremity when formed in accordance with the princlples of the present invention.

As illustrated in FIG. 12, the pilot end portion 88, as shown in cross-section, when operated upon in a manner as discussed above pursuant to the principles of the present invention, transforms itself into the configuration as illustrated in FIG. 13 and most clearly in FIG. 14 so as to include endmost leading cutting edge portions 104 which continuously extend into their respective flutes 96 thus presenting a sharpened edge of minimum cross-section.

The operation of the deburring or flash removal assembly 20 is generally characterized as an intermediary stage in the formation of the screw-drill as illustrated in FIG. 6. It has been determined that the threads 86 should be applied or formed after the burrs 98 have been removed from the screw blank 80. The threading process is conventional, and therefore the description of same is omitted for the sake of clarity.

In order to enhance the formation of the screw-drill as illustrated in FIG. 6 on a mass productive basis, the assembly 20 constitutes a preferred embodiment for accommodating same. As illustrated in FIG. 4, a plurality of burred blanks of the formation as illustrated in FIG. 10, are deposited between the tracks 70 by a feeding apparatus (not illustrated) at the uppermost portion of FIG. 4. These burred blanks are fed in adjoining relation until the serrated wheel 68 contacts the unthreaded shank 97 of the blanks. In order to effect the principles of the present invention, the serrated wheel 68 is rotated clockwise in the direction of arrow A so as to rotate the unthreaded shank 97 counter-clockwise in the direction of arrow B. It is significant that the spacing between the track 70 is controllable such so as to prevent rotation of the burrs on the pilot end portion 88 and thus, the cutting edge portion 104 formed on each of the cutting surfaces 94 respectively, is forced to bend or incline into its respective flute 96 so that the relationship of the cutting surfaces 94 relative to the cutting edges 104 respectively, is as illustrated in FIG. 14. It is clear that after the pilot end portions 88 have been deburred in accordance with the principles of the present invention as discussed above, the ultimate step or stage is to form threaded convolutions 86 on the shank 97 so that the resultant article is that of a so-called screw-drill article as illustrated in FIG. 6.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A method of forming a drilling screw comprising the steps of forming an elongate shank including a trailing end portion at one end of said shank and a drilling pilot end portion at an opposite end of said shank; forming in said pilot end portion a pair of laterally opposed grooves each gradually increasing in depth in a direction away from said trailing end portion, each of said grooves comprising a pair of adjoining surfaces inclined relative to one another, one of said surfaces constituting a relief surface and the other a cutting surface; simultaneously with the last step forming a removable portion integrally connected with said pilot end portion along a weakened fracture line portion which defines cutting edge portions, the cutting surface of each groove forming a first angle with a surface of a respective cutting edge portion; twisting said shank in a predetermined direction relative to said removable portion about the axis of said shank in such a manner as to sever said removable portion from said pilot end portion along said weakened fracture line portion while simultaneously inwardly deforming said cutting edge portions into associated grooves to thereby form leading cutting edges substantially extending along the original fracture line portion, each of said leading cutting edges being inclined relative to an associated cutting surface at a second angle smaller than said first angle existing prior to the twisting step; and threading an intermediate portion of said shank between said trailing and pilot end portions with a thread arranged in such a manner so that when the screw is turned in a direction opposite to said predetermined direction about the axis of said shank and advanced into a material said leading cutting edges contact the material prior to said cutting surfaces making contact with said material.

2. A method as claimed in claim 1, including forming said pilot end portion with a pair of laterally opposite arcuate land surfaces in interposition between said grooves respectively.

3. A method as claimed in claim 1, including forming said pilot end portion with a generally circular cross-section.

4. A method as claimed in claim 1, including feeding said blank punched with said pilot end portion between a pair of spaced tracks, and rotating a wheel in contact with said shank and extending partly between said tracks to twist said shank and removable portion relative to one another.

5. A method as claimed in claim 1, comprising the further step of forming an enlarged head at said trailing end portion.

* * * * *